United States Patent
Bläcker

(10) Patent No.: US 6,340,879 B1
(45) Date of Patent: Jan. 22, 2002

(54) DEVICE FOR REACTIVATING AN ELECTRIC BATTERY

(75) Inventor: Bernhard Bläcker, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/497,186

(22) Filed: Feb. 3, 2000

(51) Int. Cl.$^7$ .............................. H02J 7/16; H05B 11/00
(52) U.S. Cl. .................. 320/153; 320/130; 219/201
(58) Field of Search .................................. 320/130, 131, 320/157, 153; 219/201, 209

(56) References Cited

U.S. PATENT DOCUMENTS

| | | | |
|---|---|---|---|
| 5,362,942 A | * 11/1994 | Vanderslice, Jr. et al. | .. 219/209 |
| 6,078,163 A | * 6/2000 | Horie et al. | ................. 320/104 |
| 6,163,135 A | * 12/2000 | Nakayama et al. | ......... 320/150 |

FOREIGN PATENT DOCUMENTS

| | | |
|---|---|---|
| DE | 1817832 | 9/1960 |
| DE | 4142628 | 5/1993 |

OTHER PUBLICATIONS

G. Loocke, et al, Induktive Beheizung von Kraftfahrzeug-Star terbatterien, In: etz, Bd. 106, 1985, H.11, S. 552–558;Zusammenf,. S. 557, linke Spalte.

* cited by examiner

Primary Examiner—Gregory J Toatley, Jr.
(74) Attorney, Agent, or Firm—Antonelli, Terry, Stout & Kraus, LLP

(57) ABSTRACT

The invention concerns a device for reactivating an electric battery (B) which is no longer able to supply the required minimum amount of electrical power to a connected consumer unit because it was supercooled by frost. The object of the invention is to create a solution, at a justifiable cost of time and energy, which enables the consumer unit to operate as soon as possible or keep it operating after the effect of extremely low temperatures on the battery. According to the invention, the reactivation of the battery takes place by internally heating the electrolyte, which is achieved with the help of its own time-controlled current via the battery contacts, whereby a negligibly small electric output is transformed in the external circuit. To that end the high internal resistance during supercooling is utilized and works as an internal heating element. A reactive load (X) is advantageously connected to at least one inductive and/or capacitive element through the battery contacts (+,−). During the reactivation a control circuit (CC) periodically switches the reactive load (X) via at least one switch (S1, S2, S3, S4) so that an alternating reactive current ($I_L$) flows through the battery (B).

25 Claims, 2 Drawing Sheets

DEVICE FOR REACTIVATING AN ELECTRIC BATTERY

BACKGROUND OF THE INVENTION

A known disadvantage in batteries of all types is that their internal electrochemical reaction, and thus the maximum utilizable output, basically depends very heavily on the battery's internal temperature. When the temperature drops, the speed of the chemical reaction in the electrons decreases. This lowers the maximum electrical current which the battery is able to supply during constant no-load voltage, and thus the battery's output. Furthermore the speed of the mass transfer within the electrolyte and within the porous battery electrodes decreases. Both factors considerably increase the internal resistance of the cold battery. This means that in a supercooled condition of the cells even a fully charged battery is unable to supply all of its nominal electrical output because of its high internal resistance. However the nominal output can be obtained again without adding any charging energy as soon as the battery warms up to normal temperature.

The temperature dependence is also especially disadvantageous for example when the battery has to supply a D.C. voltage transformer where a predetermined electrical output is obtained from the secondary side, regardless of the voltage at the battery contacts. The transmission operation of a radio telephone for example requires an electrical output of a few watts for the power amplifier. Because of the high internal resistance, the voltage at the battery contacts is low and the transformer control causes an increase in current consumption in order to provide the required output. This in turn causes a further voltage reduction at the contacts. Since the transformer does not receive sufficient output, its control is interrupted and goes into an uncontrolled operating mode which corresponds to a total battery discharge.

For example if the transformer is used for a radio telephone, its control perceives this operating condition as a discharged battery and switches the radio telephone to the stand-by mode to protect it from becoming fully discharged. Although the battery is still sufficiently charged, it is impossible in this mode to establish a connection to the network. This situation represents a considerable safety risk for the emergency call function of the radio telephone.

It is known for example to protect motor vehicle starter batteries as long as possible against supercooling by adding a casing of a good thermal insulation material. Various sellers offer such a casing as a car accessory. However, on the one hand this requires a large additional volume and on the other it only provides a time-limited effect. The solution is especially unsatisfactory for a radio telephone because an additional casing undesirably increases the volume of the telephone.

To extend this effect, electronically controlled heating plates can be found in the auto accessories market. They are cemented to the surface of the starter battery housing and have electrical connectors which must be connected to the battery contacts. Such a heating plate prevents cooling of the battery by using its own power, so that its internal temperature remains in a range where the internal resistance is low enough so that the desired output can be obtained at any time.

For reasons of electrical insulation however, the cells of a battery are encased in a material which is also a good heat insulator. This causes a high thermal resistance between the inside of the battery and the heating plate and the battery's environment is kept warm at a considerable cost of electric power to prevent a decrease in its internal temperature. Due to the high thermal resistance however, it is not possible to reactivate a supercooled battery with justifiable cost of time and energy. At low temperatures therefore the heating plate always supplies a significantly higher amount of power to the environment than is required by the inside. This can overtax the battery's capacity. There is the danger that so much power has already been used to maintain the normal temperature that it is no longer possible to establish a connection because the battery is discharged.

It is also known from applicable safety provisions for the safe handling of batteries, such as the IEC recommendations for example, that an external short circuit of the connections of a battery must be strictly avoided. As can be found on the Varta Company internet site: "Basics on the subject of batteries. Additional questions for advanced students, "http://www.varta.de/knowhow/100quest/100-003.html 7", an external short circuit can have serious consequences if high gas pressure builds up inside the battery.

To carefully charge a radio telephone's battery it is known to place a temperature sensor in the battery between the insulating external skin and the metallic cell body. The radio telephone's control circuit uses this sensor to determine the battery's temperature with a relatively small delay because of the metallic contact, and then interrupts the charging if the battery has been heated to a predetermined degree. This protects against overcharging.

In the area of video technology, compare for example Philips' correspondence lessons: Electrical technology and Electronics, Volume 2, Technique and Application, the heavily reworked 8th. issue, section "Horizontal Deflection Steps", pages 231 ff, Heidelberg: Hüthig, which describes a simple functional principle for producing a sawtooth-shaped alternating current for horizontal deflection, from a direct current source such as a battery. In principle the direct current source has an inductance in series with a switch, which is bridged by a diode and conducts and blocks with alternating current. A capacitance is in parallel with the inductance. With the appropriate choice of component values in relation to the switching times of the switch, the following takes place: During the time the switch is conducting, a current from the battery builds a magnetic field in the inductance. It collapses after the switch blocks the current, which reverses its direction and the battery power oscillates in the form of a resonance vibration half-wave between the inductance and the capacitance and back. During this half-wave the voltage amplitude is still positive. The subsequent negative half-wave opens the diode and with ideal, namely loss-free components, the battery power flows back into the battery. The process is therefore also called "power recovery".

SUMMARY OF THE INVENTION

One advantage of the present invention is that it can be used regardless of cell type, cell size and the battery's structural form. The invention is particularly suited for batteries which are used to supply power to mobile devices suc as radio telephones or radio device, since the device can operate again after a few minutes. This makes it possible, for example, to make an emergency call with a radio telephone in dangerous situations, even under the effect of extreme cold such as takes place in polar regions or in Alpine areas. The content "radio telephone" is used in the present case as a generic term for all types of devices for wireless communication, particularly mobile telephones, car telephones, satellite telephones, mobile fax machines and mobile computers which can communicate with a network.

Starting with the defects of the known solutions for reactivating a battery, the object of the invention is to create a solution for a radio telephone which, with a justifiable expense of time and energy enables the use of the radio telephone as fast as possible after the effect of extremely low temperatures, or keeps the telephone in operating condition.

The reactivation of the battery takes place according to the invention through the internal heating of the electrolyte, which is done with the aid of a time-controlled intrinsic current via the battery contacts, where the external circuit transforms a negligibly small electrical power. The high internal resistance, which operates as an internal heating element, is used against supercooling. The amount of electrical power drawn from the battery for that purpose is directly converted into heat inside the battery. The result is the significantly faster heating of the internal battery structure than with the known solutions, with minimum loss of power to the environment.

A short time after the start of the reactivation, the internal resistance decreases due to the rising temperature of the electrolyte. Therefore a control circuit can intelligently monitor this process and optimally control the current for reactivating the battery in accordance with its present condition.

The internal resistance of a supercooled battery is relatively large. Its battery contacts could therefore be continuously loaded by a short circuit during the reactivation, without suffering any damage. Because of the safety provisions, this supposedly simple solution is neither permissible nor suitable in practice, since during the short circuit there is no voltage at the battery connectors to operate a control circuit, which would interrupt the process in the presence of heat. This precludes any time control of the process.

It is therefore a further object of the invention to indicate a possibility of heating the inside of the battery without causing power losses that are worth mentioning in the external circuit, so that the battery contacts can supply a voltage for operating the control circuit.

The invention achieves this in that the external circuit periodically loads the battery with short-term current peaks at or near the level of the short-circuit current. In the simplest case this is done with a switch that bridges the battery connectors in accordance with a pulse frequency which advantageously has a load ratio that depends on the internal temperature. Outside of the switch's conducting time, the battery loads a charging capacitor in order to provide operating voltage for the control circuit.

Investigations have shown however that an alternating current, which flows through the battery contacts during the reactivation, speeds up the process. For that reason and according to a first advantageous configuration of the invention, the external circuit for charging the battery is designed so that the electrical power from the battery oscillates periodically in both directions, thus like an alternating current, between the battery and an energy store in the external circuit. With this configuration as well, any active power is essentially only converted into heat inside the battery. To that end the external circuit contains a reactive (wattless) load with at least one inductive and/or capacitive element, whose connections are periodically switched by the control circuit via at least one switch, so that the reactive load is charged and discharged with alternating current.

According to another advantageous configuration of the invention, the control circuit utilizes the circumstance that the amplitude of the momentary battery voltage depends directly on the internal temperature, even during the time-limited consumption of a current. It must however be remembered that a measurement of the battery voltage while the battery contacts are under load does not provide any sure information about the battery's internal temperature. A mostly discharged battery as well as a supercooled battery has a high internal resistance and can therefore not be distinguished from a supercooled but still fully charged battery. According to the invention however the control circuit reliably distinguishes a supercooled battery from one with a low charge, by evaluating the voltage at the battery contacts in conjunction with a signal provided by the above mentioned temperature sensor. This provides the control circuit with an additional indication of the battery's temperature status during the reactivation. Since it indicates the result of the reactivation without any time delay, the reactivation ends as soon as the amplitude of the battery voltage exceeds a minimum value during the current peaks. In this way a supercooled battery can begin to be reactivated at a high load without causing any lasting damage and without violating relevant safety provisions. As soon as the internal resistance drops, the load can be reduced without any time delay.

Since in addition the time delay between the supply of power and the heating of the electrolyte is shorter than with the known solutions, the control circuit ensures that only as much power as needed to operate a radio telephone is taken from the battery.

In the following the invention will be explained by means of embodiments. The corresponding drawings show:

Figure 1:
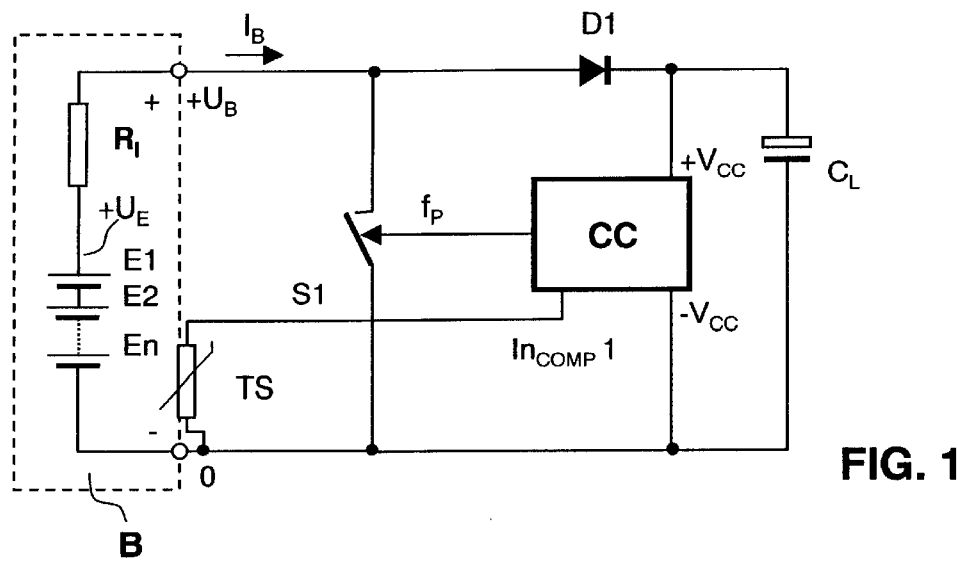
FIG. 1 illustrates the basic principle of the device according to the invention.

The device shown in FIG. 1 contains a battery B which contains n galvanic cells E1, E2, En with a total cell voltage $U_E$, an internal resistance $R_I$ and battery contacts (+) and (−) whereby a battery voltage $U_B$ can be taken from the battery B. Like all batteries, the internal resistance $R_I$ depends on its internal temperature and increases considerably with heavy supercooling, for example at an internal temperature of −20° C. or lower. A battery for a radio telephone for example may have an internal resistance $R_I$ of five ohms and more so that with a current consumption on the order of one ampere the battery voltage $U_B$ at the battery contacts (+) and (−) is considerably smaller than the total cell voltage $U_E$. A radio telephone with a voltage converter supplied by the battery B would not receive sufficient power and as described earlier would fail, as if the battery B had been fully discharged. It would no longer be possible to operate the radio telephone, e.g. to make an emergency call.

DETAILED DESCRIPTION OF THE INVENTION

FIG. 1 shows a switch S1 according to the basic principle of the invention, which bridges the battery connectors (+)

and (−) in accordance with a pulse frequency $f_p$ produced by a control circuit CC. The control circuit CC advantageously changes the keying ratio of the pulse frequency $f_p$ as a function of the internal temperature. Outside of the conducting time, the battery B charges a charging capacitor $C_L$ in order to provide operating voltage for the control circuit CC. A diode D1 prevents the discharging of capacitor $C_L$ into the battery B while the switch is conducting. A comparator in the control circuit CC is connected through a first comparator input $IN_{COMP}1$ to the above described temperature sensor TS in order to distinguish a supercooled battery from a discharge one. Since the battery voltage $U_B$ always tends to go toward zero during the periodic short circuit regardless of the internal temperature, an evaluation during the conducting time is not possible.

For that reason the illustrated basic principle is very critical in regard to a time control. As soon as any sign of heating appears the control circuit CC must increase the ratio between the blocking and conducting time to prevent damage to the battery. It is furthermore a disadvantage to use a pulsating direct current for the reactivation.

In the following solutions it is always desirable to determine at least the need of a reactivation by means of the temperature sensor TS. Such solutions, which utilize current peaks at or near the short-circuit current, also require a charging capacitor to keep the control circuit CC operational. In the interest of clarity, the illustrations and descriptions of these details are omitted in the following.

The following solutions charge the battery B with an alternating current. The result is an advantageous reactivation speed which can apparently be ascribed to a better distribution of the power supply by the alternating current at the electrodes. Accordingly the battery current $I_B$ flows twice in succession through the internal resistance $R_I$. First when the electrical energy is converted into magnetic energy, and second when this energy conversion is reversed.

Figure 2:
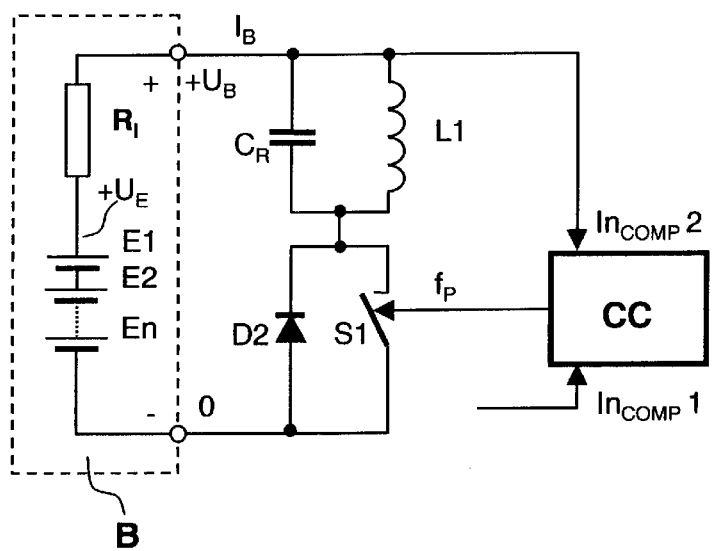
FIG. 2 illustrates a first advantageous configuration of the device according to the invention.

FIG. 2 shows a solution which corresponds to the functional principle described earlier for producing a sawtooth-shaped alternating current for the horizontal deflection of a television set. In that case the battery has an inductance L1 in series with a switch S1, which is bridged by a diode D2 and conducts and blocks through an alternating pulse frequency $f_P$. A capacitance $C_R$ lies parallel to the inductance L1. When the inductance L1 and capacitance $C_R$ values are appropriately selected in relation to the pulse frequency $f_P$ or the keying ratio, the above described effect between inductance L1 and capacitance $C_R$ takes place, whereby most of the battery power flows back into the battery.

Figure 3:
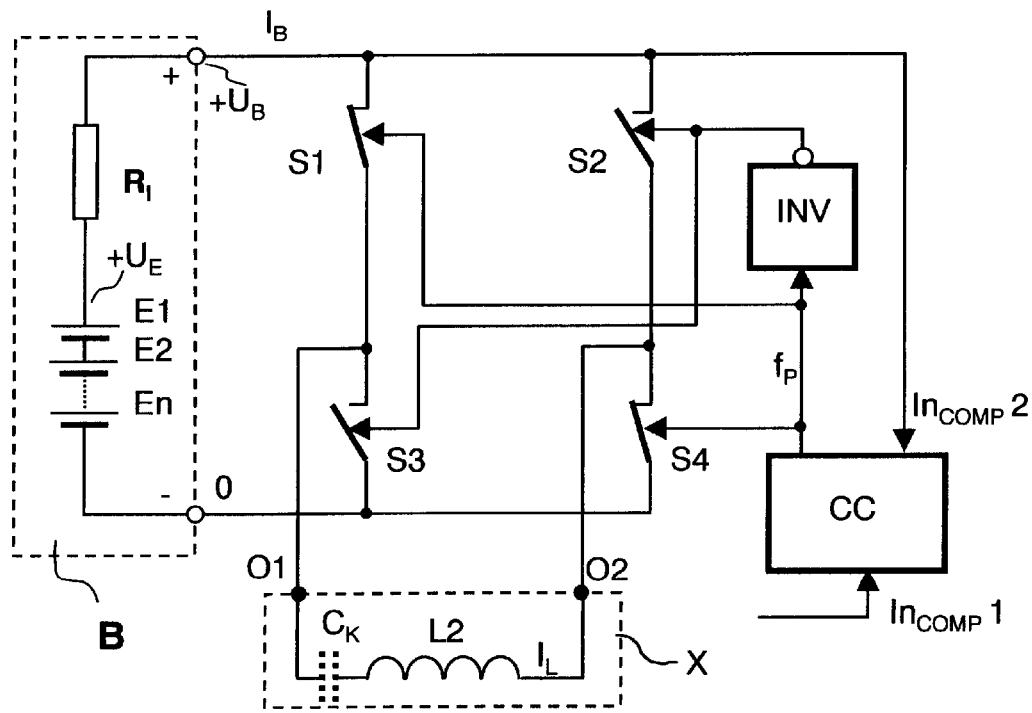
FIG. 3 illustrates a second advantageous configuration of the device according to the invention.

FIG. 3 shows another solution for producing a sawtooth-shaped alternating current for the direct internal heating of battery B. Electronically controllable switches S1, S2, S3 and S4 are arranged in a push-pull bridge circuit and are connected to the battery contacts (+), (−). The switches S1, S2, S3, S4 may be conventional field-effect transistors, bipolar transistors or similar. A reactive load X, which advantageously is an inductance L2, is located in the bridge branch between the push-pull branches S1 and S3 or S2 and S4.

Upon detecting a supercooled battery, the control circuit CC periodically switches the push-pull bridge circuit in accordance with the pulse frequency $f_P$, so that the inductance L2 is alternatingly charged with electric power and discharged. At that point the control circuit CC activates switches S1 and S4 directly, and switches S2 and S3 via an inverter INV. Of course the switches S1 and S3 or S2 and S4 of each push-pull branch can be designed as complementary push-pull output stages. In that case the control circuit CC directly controls all switches S1–S4 and the inverter INV is omitted. To activate the switches S1–S4, the control circuit CC advantageously produces a square-wave voltage, for example with a pulse frequency $f_P$ on the order of about 100 kHz. The control circuit CC advantageously changes the pulse frequency $f_P$ and/or the keying ratio of the switches S1 to S4 as a function of the battery's internal temperature, in order to immediately adapt the heating intensity to the current conditions.

Figure 4:
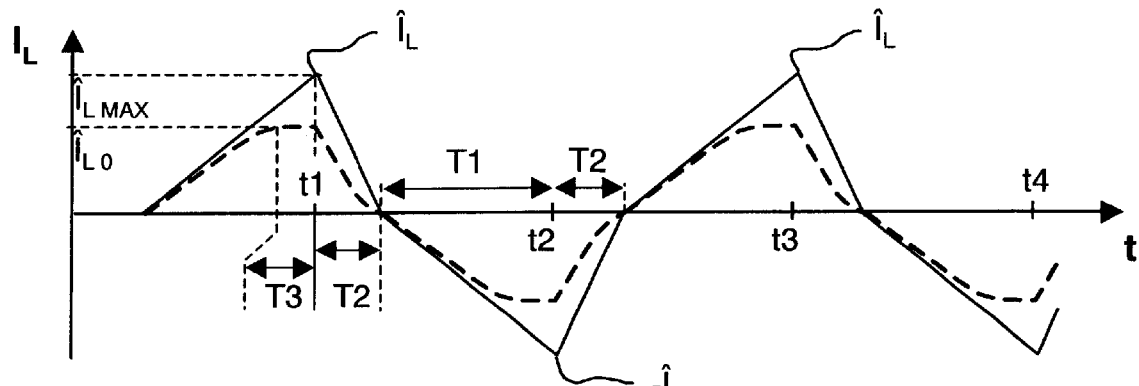
FIG. 4 illustrates the current $I_L=f(t)$ in the reactive load of the second advantageous configuration as a function of time t.

FIG. 4 shows the course in time of the reactive current $I_L$ in the reactive load X. Due to the inductance L2 the latter rises almost linearly during the time TI and the battery current $I_B$ builds a magnetic field in the inductance L2. The time T1 ends at points t1–t4 respectively when the switches S1 to S4 change over. In that case switches S1 to S4 connect the connectors O1 and O2 of the reactive load X with the respective opposite battery contact, which starts the breakdown of the magnetic field in the inductance L2. This breakdown ends after time D2. Because of the change-over to the respective other battery contact a corresponding course of the reactive current $I_L$ starts after the breakdown at the same times T1 and T2 and with the same amplitude, but in the opposite direction of the reactive current $I_L$.

Figure 5:
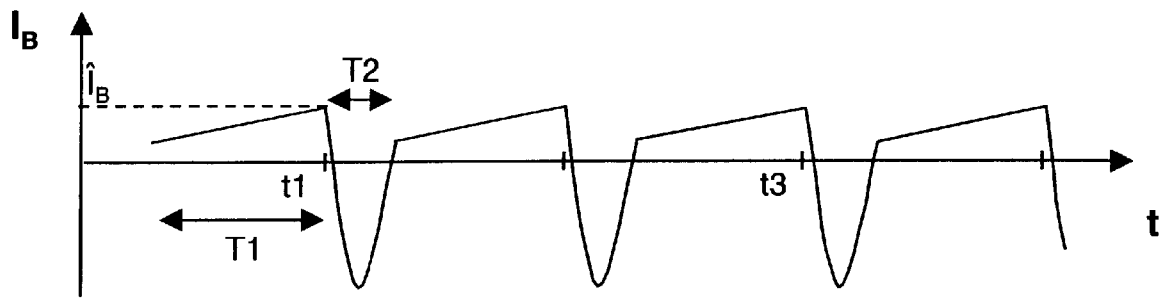
FIG. 5 illustrates the current $I_B=f(t)$ at the battery contacts as controlled by the control circuit according to the second advantageous configuration, for the direct internal heating of the battery's electrolyte as a function of time t.

The battery current $I_B$ shown in FIG. 5 is taken from the battery B. During the time T1 the battery current $I_B$ rises linearly. After the switches S1–S4 change over, the power stored in the inductance L2 decreases during the time T2. An inductive back-voltage causes a strong current surge in the opposite direction, namely back into the battery B, so that the desired alternating current flows through it. Since due to the appropriate selection of switches S1–S4 and the size of the inductance L the external circuit only has very small active impedances, most of the alternating power affects the internal resistance $R_I$.

To protect an operating battery B against excessive load caused by current peaks in the battery current $I_B$, another feature of the invention advantageously selects the size of the inductance L in relation to the pulse frequency $f_P$, so that the current peaks $\hat{I}_L,-\hat{I}_L$ in the reactive current $I_L$ can only reach a maximum peak value $\hat{I}_{LMAX}$. In this way the reactive current $I_L$ follows the curve shown by an unbroken line in FIG. 2, at least in all batteries B with an internal resistance $R_I$ that is below a predetermined value due to normal internal temperature, regardless of the actual size of the internal resistance $R_I$. The inductance L2 thus limits the peak value of the battery current 113 to a value that is below the possible short-circuit value and thus provides a protection, since this value can be very high due to the low internal resistance $R_I$.

However, according to another feature of the invention the maximum peak value $\hat{I}_{LMAX}$ can be set so high, that in a supercooled battery the high internal resistance $R_I$ limits the peak value $\hat{I}_{LO}$ of the reactive current $I_L$ to a value below the $\hat{I}_{LMAX}$ value. In such a battery the course of the reactive current $I_L$ corresponds to the broken line curve, where the peak value of the reactive current $\hat{I}_{LO}$ corresponds to the degree of supercooling. In this case the short-circuit value of the supercooled battery B is periodically available as a maximum peak current during the time T3. This means that during the time T3 the battery voltage $U_B$ drops to a minimum, namely the residual voltage in the conducting switch S1. An operative battery B however does not reach this minimum because the inductance L limits the possible short-circuit value of the battery current $I_B$.

According to a special configuration feature of the invention, the control circuit CC advantageously uses this dependence of the battery voltage $+U_B$ on the internal temperature of battery B to recognize the successful termination. A simple comparator in the control circuit CC, via the comparator input Incorn,2 in the example, detects that during the reactivation the minimum value $U_{B\ MIN}$ falls below a reference value and recognizes that this can be continued. However, if the minimum value $U_{B\ MIN}$ is above the reference value, the battery has a suitable temperature for operation and the reactivation is ended.

To keep the power losses in the external circuit small, the switches S1, S2, S3, S4 advantageously use semiconductor components which exhibit low voltage drops in the switched condition.

The reactive load X contains a blocking capacitor $C_K$. It is primarily used to prevent a direct battery current $I_B$ during the reactivation. This would occur if the control circuit detects an operative battery and stops controlling the push-pull bridge circuit. In that case one of the pairs of switches S1/S4 or S2/S3 is continuously conductive and a short-circuit direct current which is able to destroy the battery, flows to the reactive load through the continuous connection. An alternative to the capacitor $C_K$ is to simultaneously switch off all switches S1 to S4.

Figure 6:
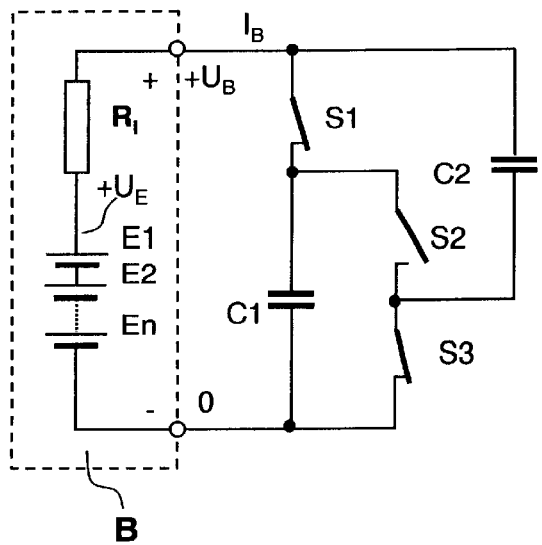
FIG. 6 illustrates another configuration of the invention without inductance.

During reactivation the circuit in FIG. 6 also produces an alternating current $I_B$. In a first signal condition of the pulse frequency $f_P$, the switches S1 and S3 are closed and switch S2 is open. A current $I_B$ flows from the battery and charges the capacitors C1 and C2 which lie parallel in this signal condition. They attain a charging voltage $U_{C1}$, $U_{C2}$, which should be advantageously close to the total cell voltage $U_E$. Switches S1 and S3 open and switch S2 closes when the signal condition of the pulse frequency $f_P$ changes. As a result the capacitors C1 and C2 are in series. Since the charging voltages $U_{C1}$, $U_{C2}$ are additive, the sum is greater than the total cell voltage $U_E$ and a charging current $-I_B$ flows into the battery until it discharges.

If the circuit in FIG. 3 uses only one capacitor C as the reactive load X, the desired limitation of the current peaks does not take place. Instead, after the switches S1 to S4 change over, a larger peak current $\hat{I}_B$ flows through the internal resistance $R_I$ due to the voltage addition in capacitor C. Since the reactive load X has a pulsating direct current $I_B$ flowing through the battery instead of an alternating current, this reactive load is especially suited for batteries which do not contain any rechargeable primary elements.

A significant advantage of the invention is that for only a small additional cost, the device for reactivating an electric battery B can be incorporated into the known management of a radio telephone for monitoring or the operational readiness of the battery B. Also, since the charged condition of the battery is continuously controlled in a radio telephone, the solution of the invention can be used to regularly check at predetermined time intervals whether a reactivation is required because of low ambient temperatures.

What is claimed is:

1. A device for reactivating an electrical battery which because of the effect of frost on the inside of the battery is unable to supply the required minimum amount of electric power through battery contacts to a connected consumer unit comprising:

an electronic control circuit which is connected to the battery contacts for heating the inside of the battery by its own battery current through the battery contacts, causing a direct internal heating of the electrolyte such that a minimum of electric output is provided by an external circuit without regard to availability of battery voltage.

2. A device as claimed in claim 1, wherein the external circuit contains at least one switch which is periodically switched by the control circuit during reactivation so that a pulsating battery current flows through the battery, and a capacitor can store battery voltage during blocking.

3. A device as claimed in claim 1, wherein the external circuit contains a reactive load with at least one inductive and/or capacitive element, whose connectors are periodically switched by the control circuit during reactivation by at least one switch, so that an alternating reactive current flows through the battery.

4. A device as claimed in claim 3, wherein the reactive load is an inductance with a parallel resonance capacity, which is periodically switched to the battery contacts by a series switch, where a diode lies parallel to the switch and is located in a blocking direction of the battery voltage.

5. A device as claimed in claim 3, wherein the switches form a push-pull bridge circuit which connects the reactive load connectors crosswise to the battery contacts with alternating current, so that a sawtooth-shaped alternating current flows through them, where its current peaks are at least below the short circuit current of the battery when it is not supercooled.

6. A device as claimed in claim 5, wherein the reactive load (X) is an inductance.

7. A device as claimed in claim 1, wherein to protect an operative battery against too high a load caused by current peaks, the size of an inductance in relation to the pulse frequency and/or keying ratio is chosen so that the current peaks are at least below the short-circuit current of the battery when it is not supercooled.

8. A device as claimed in claim 4, wherein a size of the inductance in relation to the pulse frequency and/or keying ratio is chosen so that a supercooled battery is charged with current peaks at or near the level of the short-circuit current.

9. A device as claimed in claim 1, wherein the electronic control circuit adjusts the pulse frequency and/or the keying ratio as a function of the temperature of battery, so as to adapt the intensity of the direct internal heating to the actual conditions without any delay.

10. A device as claimed in claim 3, the electronic control circuit evaluates the battery voltage during the current peaks and also monitors heating by a temperature sensor in order to end the reactivation or prevent an operative battery from being reactivated.

11. A device as claimed in claim 6, wherein to protect an operative battery against too high a load caused by current peaks, the size of an inductance in relation to the pulse frequency and/or keying ratio is chosen so that the current peaks are at least below the short-circuit current of the battery when it is not supercooled.

12. A device as claimed in claim 4, wherein the electronic control circuit evaluates the battery voltage during the current peaks and also monitors heating by a temperature sensor in order to end the reactivation or prevent an operative battery from being reactivated.

13. A device as claimed in claim 5, wherein the electronic control circuit evaluates the battery voltage during the current peaks and also monitors heating by a temperature sensor in order to end the reactivation or prevent an operative battery from being reactivated.

14. A device as claimed in claim 6, wherein the electronic control circuit evaluates the battery voltage during the current peaks and also monitors heating by means of a temperature sensor (TS) in order to end the reactivation or prevent an operative battery from being reactivated.

15. A device as claimed in claim 7, wherein the electronic control circuit evaluates the battery voltage during the current peaks and also monitors heating by a temperature sensor in order to end the reactivation or prevent an operative battery from being reactivated.

16. A device as claimed in claim 8, wherein the electronic control circuit evaluates the battery voltage during the current peaks and also monitors heating by a temperature sensor (TS) in order to end the reactivation or prevent an operative battery from being reactivated.

17. A device as claimed in claim 9, wherein the electronic control circuit evaluates the battery voltage during the current peaks and also monitors heating by a temperature sensor in order to end the reactivation or prevent an operative battery from being reactivated.

18. A device as claimed in claim 6, wherein a size of the inductance in relation to the pulse frequency and/or keying ratio is chosen so that a supercooled battery is charged with current peaks at or near the level of the short-circuit current.

19. A device as claimed in claim 2, wherein the electronic control circuit adjusts the pulse frequency and/or the keying ratio as a function of the temperature of battery, so as to adapt the intensity of the direct internal heating to the actual conditions without any delay.

20. A device as claimed in claim 3, wherein the electronic control circuit adjusts the pulse frequency and/or the keying ratio as a function of the temperature of battery, so as to adapt the intensity of the direct internal heating to the actual conditions without any delay.

21. A device as claimed in claim 4, wherein the electronic control circuit adjusts the pulse frequency and/or the keying ratio as a function of the temperature of battery, so as to adapt the intensity of the direct internal heating to the actual conditions without any delay.

22. A device as claimed in claim 5, wherein the electronic control circuit adjusts the pulse frequency and/or the keying ratio as a function of the temperature of battery, so as to adapt the intensity of the direct internal heating to the actual conditions without any delay.

23. A device as claimed in claim 6, wherein the electronic control circuit adjusts the pulse frequency and/or the keying ratio as a function of the temperature of battery, so as to adapt the intensity of the direct internal heating to the actual conditions without any delay.

24. A device as claimed in claim 7, wherein the electronic control circuit adjusts the pulse frequency and/or the keying ratio as a function of the temperature of battery, so as to adapt the intensity of the direct internal heating to the actual conditions without any delay.

25. A device as claimed in claim 8, wherein the electronic control circuit adjusts the pulse frequency and/or the keying ratio as a function of the temperature of battery, so as to adapt the intensity of the direct internal heating to the actual conditions without any delay.

* * * * *

UNITED STATES PATENT AND TRADEMARK OFFICE
CERTIFICATE OF CORRECTION

PATENT NO. : 6,340,879 B1  Page 1 of 1
APPLICATION NO. : 09/497186
DATED : January 22, 2002
INVENTOR(S) : Bernhard Bläcker It is certified that error appears in the above-identified patent and that said Letters Patent is hereby corrected as shown below:

ON THE TITLE PAGE

Below Item "(22)":
Insert Item -- (30) Foreign Application Priority Data

Feb. 3, 1999 (DE).....................19904181.4 --.

Signed and Sealed this

Twenty-ninth Day of December, 2009

David J. Kappos
*Director of the United States Patent and Trademark Office*